US010461900B2

(12) United States Patent
Rost et al.

(10) Patent No.: US 10,461,900 B2
(45) Date of Patent: Oct. 29, 2019

(54) HIERARCHICAL ARRANGEMENT AND MULTIPLEXING OF MOBILE NETWORK RESOURCE SLICES FOR LOGICAL NETWORKS

(71) Applicant: NOKIA SOLUTIONS AND NETWORKS OY, Espoo (FI)

(72) Inventors: Peter Rost, Heidelberg (DE); Christian Mannweiler, Neubiberg (DE)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 16/072,307

(22) PCT Filed: Jan. 26, 2016

(86) PCT No.: PCT/EP2016/051563
§ 371 (c)(1),
(2) Date: Jul. 24, 2018

(87) PCT Pub. No.: WO2017/129230
PCT Pub. Date: Aug. 3, 2017

(65) Prior Publication Data
US 2019/0028249 A1  Jan. 24, 2019

(51) Int. Cl.
*H04L 5/00* (2006.01)
*H04W 28/16* (2009.01)
(Continued)

(52) U.S. Cl.
CPC .......... *H04L 5/0037* (2013.01); *H04L 5/0001* (2013.01); *H04W 28/06* (2013.01);
(Continued)

(58) Field of Classification Search
None
See application file for complete search history.

(56) References Cited

U.S. PATENT DOCUMENTS

2015/0063166 A1\* 3/2015 Sif .................. G06F 9/45558
370/254
2016/0077989 A1\* 3/2016 Pulyala ................ G06F 13/287
710/308
(Continued)

OTHER PUBLICATIONS

International Search Report and Written Opinion for International Application No. PCT/EP2016/051563, dated Sep. 23, 2016 (12 pages).
(Continued)

*Primary Examiner* — Christine T Duong
(74) *Attorney, Agent, or Firm* — Brake Hughes Bellermann LLP (57) ABSTRACT

An apparatus may include a hierarchical arrangement of a plurality of resource slices of a mobile network. Each of a plurality of logical networks is allocated a resource slice within the mobile network for each of a plurality of layers, wherein each logical network provides network services for one of a plurality of service categories; wherein each logical network includes at least one dedicated resource slice that is dedicated to the logical network, and at least one shared resource slice that is shared among a plurality of the logical networks; the plurality of resource slices including a plurality of resource slices of a first layer and a plurality of resource slices of a second layer, wherein the first layer is lower than the second layer, wherein data from a set of the resource slices of the second layer are aggregated into a single resource slice of the first layer (downlink direction) and data from the single resource slice of the first layer is demultiplexed and forwarded to a selected resource slice of the set of resource slices of the second layer (uplink direction).

15 Claims, 4 Drawing Sheets

(51) Int. Cl.
*H04W 72/12* (2009.01)
*H04W 28/06* (2009.01)
*H04W 48/18* (2009.01)
*H04W 4/70* (2018.01)
*H04W 80/02* (2009.01)

(52) U.S. Cl.
CPC .......... *H04W 28/16* (2013.01); *H04W 48/18* (2013.01); *H04W 72/1263* (2013.01); *H04W 4/70* (2018.02); *H04W 80/02* (2013.01)

(56) References Cited

U.S. PATENT DOCUMENTS

2016/0249353 A1* 8/2016 Nakata ................. H04W 28/16
2017/0079059 A1* 3/2017 Li ......................... H04W 16/02
2017/0085493 A1* 3/2017 Senarath ............... H04L 47/522

OTHER PUBLICATIONS

3GPP TS 23.251 V8.2.0 (Mar. 2010); 3rd Generation Partnership Project; Technical Specification Group Services and System Aspects; Network Sharing; Architecture and functional description (Release 8); Sophia Antipolis, France; Mar. 2010; 20 pages.
3GPP TS 23.401 V13.4.0 (Sep. 2015); 3rd Generation Partnership Project; Technical Specification Group Services and System Aspects; General Packet Radio Service (GPRS) enhancements for Evolved Universal Terrestrial Radio Access Network (E-UTRAN) access (Release 13); Sophia Antipolis, France; Sep. 2015; 334 pages.
3GPP TS 36.300 V13.1.0 (Sep. 2015); 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 13); Sophia Antipolis, France; Sep. 2015; 254 pages.
3GPP TSG SA Meeting #68; TD SP-150249; "Updated WID: Dedicated Core Networks (DECOR)"; Malmö, Sweden; Jun. 17-19, 2015; 5 pages.
Costa-Pérez et al.; "Radio Access Network Virtualization for Future Mobile Carrier Networks"; IEEE Communications Magazine, vol. 51, No. 7; Jul. 1, 2013; pp. 27-35.
NEC Corporation; White Paper—RAN Sharing: "NEC's Approach towards Active Radio Access Network Sharing"; Dec. 31, 2013; 6 pages.
NGMN Alliance; "Description of Network Slicing Concept"; NGMN 5G Project Requirements & Architecture—Work Stream End-to-End Architecture, Version 1.0; Jan. 13, 2016; 7 pages.
NGMN Alliance; "5G White Paper"; NGMN 5G Initiative; Feb. 17, 2015; 125 pages.
3GPP TR 32.851 V12.1.0 (Dec. 2013); 3rd Generation Partnership Project; Technical Specification Group Services and System Aspects; Telecommunication management; Study on Operations, Administration and Maintenance (OAM) aspects of Network Sharing (Release 12); Sophia Antipolis, France; Dec. 2013; 38 pages.
Fu et al.; "Stochastic Game for Wireless Network Virtualization"; IEEE/ACM Transactions on Networking, vol. 21, No. 1; Feb. 2013; pp. 84-97.
Kokku et al.; "NVS: A Substrate for Virtualizing Wireless Resources in Cellular Networks"; IEEE/ACM Transactions on Networking, vol. 20. No. 5; Oct. 2012; pp. 1333-1346.
Liang et al.; "Wireless Network Visualization: A Survey, Some Research Issues and Challenges", IEEE Communications Surveys & AMP Tutorials, Jul. 2014; Sect. I, Ill, IV, Fig. 3, 6, 7; 25 pages.

* cited by examiner

HIERARCHICAL ARRANGEMENT AND MULTIPLEXING OF MOBILE NETWORK RESOURCE SLICES FOR LOGICAL NETWORKS

CROSS-REFERENCE TO RELATED APPLICATIONS

This application is a national stage entry of PCT Application No. PCT/EP2016/051563 filed Jan. 26, 2016, entitled "HIERARCHICAL ARRANGEMENT AND MULTIPLEXING OF MOBILE NETWORK RESOURCE SLICES FOR LOGICAL NETWORKS" which is hereby incorporated by reference in its entirety.

TECHNICAL FIELD

This description relates to communications.

BACKGROUND

A communication system may be a facility that enables communication between two or more nodes or devices, such as fixed or mobile communication devices. Signals can be carried on wired or wireless carriers.

An example of a cellular communication system is an architecture that is being standardized by the $3^{rd}$ Generation Partnership Project (3GPP). A recent development in this field is often referred to as the long-term evolution (LTE) of the Universal Mobile Telecommunications System (UMTS) radio-access technology. E-UTRA (evolved UMTS Terrestrial Radio Access) is the air interface of 3GPP's Long Term Evolution (LTE) upgrade path for mobile networks. In LTE, base stations or access points (APs), which are referred to as enhanced Node Bs (eNBs), provide wireless access within a coverage area or cell. In LTE, mobile devices, or mobile stations are referred to as user equipments (UE). LTE has included a number of improvements or developments. 5G wireless networks are also being developed that provide additional capabilities.

In addition, infrastructure for a mobile (or wireless) network is typically allocated to a specific mobile network operator (MNO). Also, resources for mobile networks are typically allocated in a relatively inflexible manner.

SUMMARY

According to an example implementation, an apparatus includes a hierarchical arrangement of a plurality of resource slices of a mobile network, wherein each of a plurality of logical networks is allocated a resource slice within the mobile network for each of a plurality of layers, wherein each logical network provides network services for one of a plurality of service categories; wherein each logical network is allocated at least one dedicated resource slice that is dedicated to the logical network, and at least one shared resource slice that is shared among a plurality of the logical networks; the plurality of resource slices including a plurality of resource slices of a first layer and a plurality of resource slices of a second layer, wherein the first layer is lower than the second layer, wherein data from a set of the resource slices of the second layer are aggregated into a first resource slice of the first layer; a multiplexer interfacing at least between the set of resource slices of the second layer and the first resource slice of the first layer; and a multiplexing policy function (MPF) configured to control the multiplexer to aggregate data of the set of resource slices of the second layer into the first slice of the first layer.

According to an example implementation, a method is provided including: providing a hierarchical arrangement of a plurality of resource slices of a mobile network; allocating, to each of a plurality of logical networks, a resource slice within the mobile network for each of a plurality of layers, wherein each logical network provides network services for one of a plurality of service categories, the allocating including: allocating, for each of the logical networks, at least one dedicated resource slice to the logical network; and allocating, for each of the logical networks, at least one shared resource slice to the logical network, the shared resource slice being shared among a plurality of the logical networks, and wherein the plurality of resource slices include a plurality of resource slices of a first layer and a plurality of resource slices of a second layer, wherein the first layer is lower than the second layer; interfacing, by a multiplexer, between at least a set of resource slices of the second layer and a first resource slice of the first layer, wherein the interfacing includes: aggregating data from the set of resource slices of the second layer into the first resource slice of the first layer; and controlling, by a multiplexing policy function (MPF), the interfacing by the multiplexer to aggregate data of the set of resource slices of the second layer into the first slice of the first layer.

According to an example implementation, a computer program product includes a computer-readable storage medium and storing executable code that, when executed by at least one data processing apparatus, is configured to cause the at least one data processing apparatus to perform a method including: providing a hierarchical arrangement of a plurality of resource slices of a mobile network; allocating, to each of a plurality of logical networks, a resource slice within the mobile network for each of a plurality of layers, wherein each logical network provides network services for one of a plurality of service categories, the allocating including: allocating, for each of the logical networks, at least one dedicated resource slice to the logical network; and allocating, for each of the logical networks, at least one shared resource slice to the logical network, the shared resource slice being shared among a plurality of the logical networks, and wherein the plurality of resource slices include a plurality of resource slices of a first layer and a plurality of resource slices of a second layer, wherein the first layer is lower than the second layer; interfacing, by a multiplexer, between at least a set of resource slices of the second layer and a first resource slice of the first layer, wherein the interfacing includes: aggregating data from the set of resource slices of the second layer into the first resource slice of the first layer; and controlling, by a multiplexing policy function (MPF), the interfacing by the multiplexer to aggregate data of the set of resource slices of the second layer into the first slice of the first layer.

According to another example implementation, an apparatus includes means for providing a hierarchical arrangement of a plurality of resource slices of a mobile network; means for allocating, to each of a plurality of logical networks, a resource slice within the mobile network for each of a plurality of layers, wherein each logical network provides network services for one of a plurality of service categories, the means for allocating including: means for allocating, for each of the logical networks, at least one dedicated resource slice to the logical network; and means for allocating, for each of the logical networks, at least one shared resource slice to the logical network, the shared resource slice being shared among a plurality of the logical networks, and wherein the plurality of resource slices include a plurality of resource slices of a first layer and a plurality of resource slices of a second layer, wherein the first layer is lower than the second layer; means for interfacing, by a multiplexer, between at least a set of resource slices of the second layer and a first resource slice of the first layer, wherein the means for interfacing includes: means for aggregating (or multiplexing) data from the set of resource slices of the second layer into the first resource slice of the first layer; and means for controlling, by a multiplexing policy function (MPF), the interfacing by the multiplexer to aggregate data of the set of resource slices of the second layer into the first slice of the first layer.

The details of one or more examples of implementations are set forth in the accompanying drawings and the description below. Other features will be apparent from the description and drawings, and from the claims.

DETAILED DESCRIPTION

Figure 1:
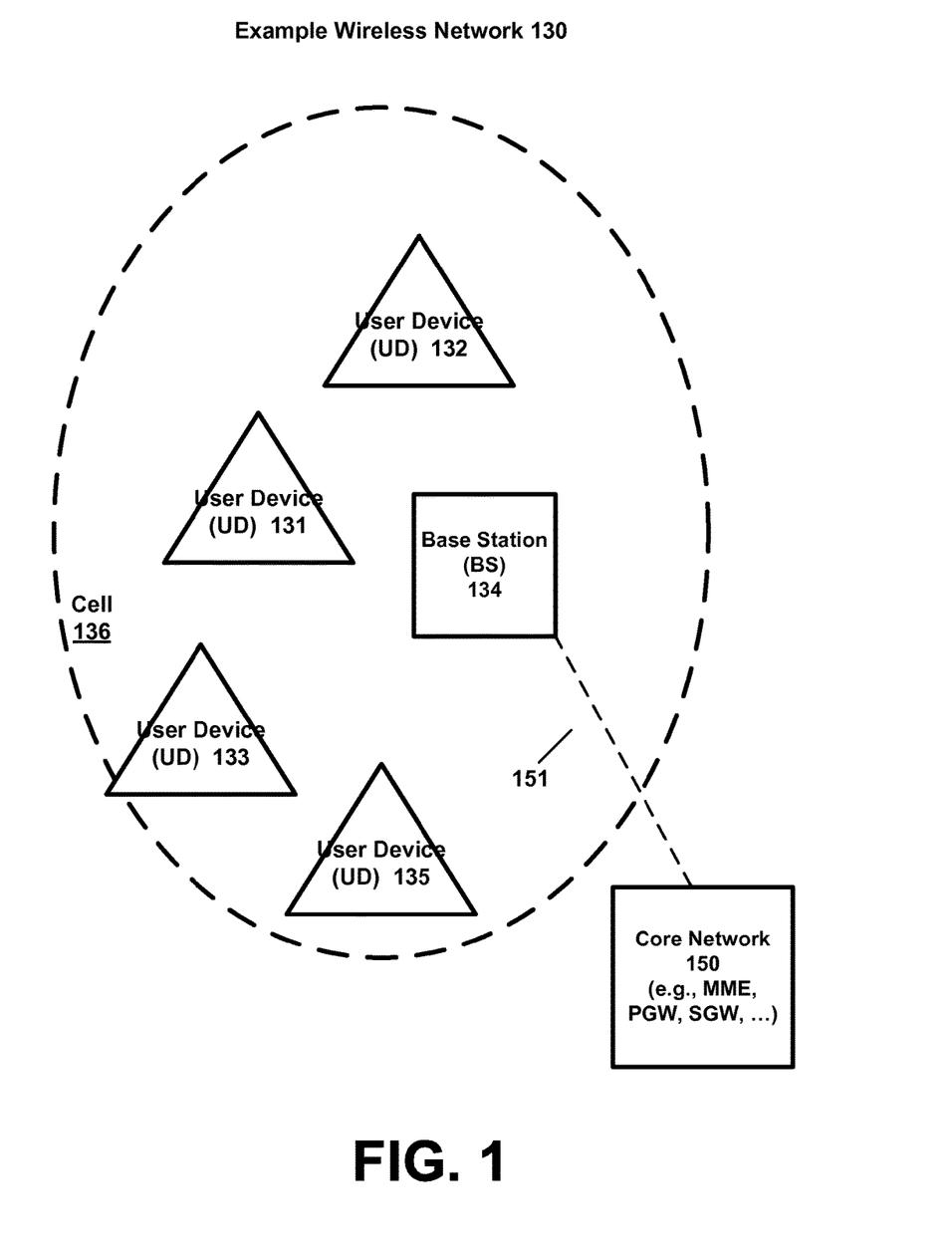
FIG. 1 is a block diagram of a wireless network according to an example implementation.

FIG. 1 is a block diagram of a wireless network 130 according to an example implementation. In the wireless network 130 of FIG. 1, user devices 131, 132, 133 and 135, which may also be referred to as mobile stations (MSs) or user equipment (UEs), may be connected (and in communication) with a base station (BS) 134, which may also be referred to as an access point (AP), an enhanced Node B (eNB) or a network node. At least part of the functionalities of an access point (AP), base station (BS) or (e)Node B (eNB) may also be carried out by any node, server or host which may be operably coupled to a transceiver, such as a remote radio head. BS (or AP) 134 provides wireless coverage within a cell 136, including to user devices 131, 132, 133 and 135. Although only four user devices are shown as being connected or attached to BS 134, any number of user devices may be provided. BS 134 is also connected to a core network 150 via a S1 interface 151. This is merely one simple example of a mobile network, and others may be used.

A user device (user terminal, user equipment (UE)) may refer to a portable computing device that includes wireless mobile communication devices operating with or without a subscriber identification module (SIM), including, but not limited to, the following types of devices: a mobile station (MS), a mobile phone, a cell phone, a smartphone, a personal digital assistant (PDA), a handset, a device using a wireless modem (alarm or measurement device, etc.), a laptop and/or touch screen computer, a tablet, a phablet, a game console, a notebook, and a multimedia device, as examples. It should be appreciated that a user device may also be a nearly exclusive uplink only device, of which an example is a camera or video camera loading images or video clips to a network.

In LTE (as an example), core network 150 may be referred to as Evolved Packet Core (EPC), which may include a mobility management entity (MME) which may handle or assist with mobility/handover of user devices between BSs, one or more gateways that may forward data and control signals between the BSs and packet data networks or the Internet, and other control functions or blocks. The gateways of the core network may include one or more serving gateways (SGW) and one or more packet data network gateways (PGW).

The various example implementations may be applied to a wide variety of wireless technologies or wireless networks, such as LTE, LTE-A, 5G, cmWave, and/or mmWave band networks, or any other wireless network. LTE, 5G, cmWave and mmWave band networks are provided only as illustrative examples, and the various example implementations may be applied to any wireless technology/wireless network (or mobile network).

In some cases, various resources of a core network and/or various resources of a radio access network (RAN) may be allocated to a specific mobile network operator and/or may be allocated to provide mobile or wireless services for a service category, out of a plurality of possible service categories. Such an approach may typically involve physical resources (e.g., processor/processing resources, memory, network resources) and/or software/protocol resources that may be dedicated to the mobile network operator and/or dedicated to the service category.

According to an example implementation, to improve network flexibility and improve usage of network resources, a plurality of logical networks may be provided, where each logical network may include one or more shared resources (e.g., shared among a plurality of logical networks) and a dedicated resource (e.g., dedicated to a single logical network) to provide a service(s) of one or more service categories. A logical network may also be provided for each of one or more mobile network operators (MNOs). Also, for example, multiple logical networks may be provided for a mobile network operator (MNO), including a logical network provided for each of a plurality of service categories for the MNO. In an example implementation, one or more mobile network resources may each be sliced (or divided) into a plurality of resource slices, and a slice of the network resource may be allocated to each logical network. According to an example implementation, a hierarchical arrangement of a plurality of resource slices of a mobile network may be provided, wherein each of a plurality of logical networks is allocated a resource slice within the mobile network for each of a plurality of layers. By providing a hierarchical arrangement of resource slices and allocating a resource slice of different layers to each of a plurality of logical networks, this arrangement may allow a sharing of some network resources among a plurality of logical networks and/or to provide different service categories. In some cases, the resource slices allocated to each logical network (e.g., for different service categories) may be provided or implemented with one or more different parameters (e.g., a different Quality of Service for different service categories) that may be specific to each logical network, while sharing one or more network resources.

The service categories may include a number of different service categories, such as, for example: critical machine type communication (CMTC); massive machine type communication (MMTC), including Internet of Things (IoT) communication; and mobile broadband communication (MBB). CMTC may include, for example, some critical or time-sensitive applications that require guaranteed data delivery and very low latency, such as self-driving vehicles/automobiles, remotely controlled vehicles (e.g., automobiles, aircraft), vehicle-to-vehicle (V2V) communication that may support self-driving vehicles or other applications, remote surgery applications, etc. MMTC may include applications that include, for example, many devices that communicate, such as sensors, utility meters, and Internet of Things (IoT) devices. IoT may refer to an ever-growing group of objects that may have Internet or network connectivity, so that these objects may send information to and receive information from other network devices. For example, many sensor type applications or devices may monitor a physical condition or a status, and may send a report to a server or other network device. For example, MMTC/IoT may require medium bandwidth, and may not typically require low latency. MBB may include mobile data communications or mobile broadband, such as mobile Internet access, and may include providing services such as web browsing, Voice over IP (Internet Protocol) or Voice over LTE, streaming video delivery, etc. Each of the different service categories may have specific needs or requirements (e.g., such as different QoS requirements).

Figure 2:
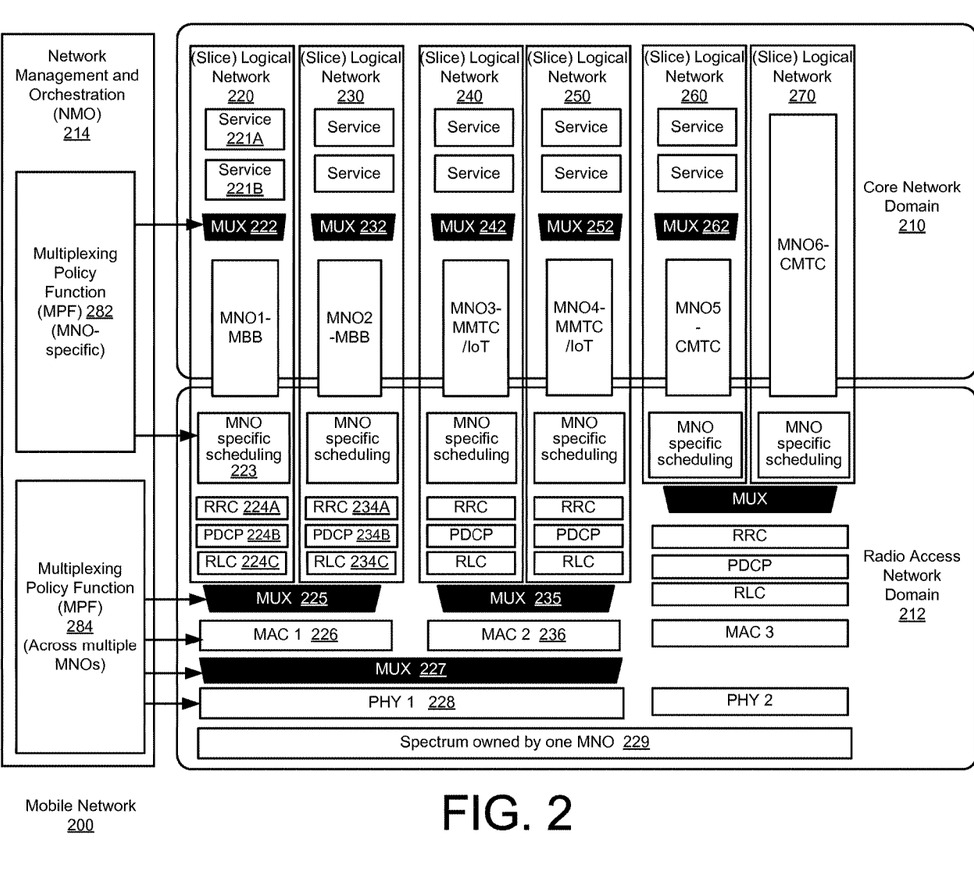
FIG. 2 is a block diagram illustrating a mobile network including a hierarchical arrangement of resource slices for each of a plurality of logical networks.

FIG. 2 is a block diagram illustrating a mobile network including a hierarchical arrangement of resource slices for each of a plurality of logical networks. As shown in FIG. 2, mobile network 200 illustrating a core network domain 210, a radio access network (RAN) domain 212, and a network management and orchestration (NMO) entity 214. Core network domain 210 may include resources associated with core network 150, such as, for example, a mobility management entity (MME), one or more gateways, which may include one or more signaling gateways (SGWs) and one or more packet data network gateways (PGWs) for communicating user data between a packet network and one or more BSs or a RAN (radio access network). RAN domain 212 may include one or more RAN resources, such as one or more base station (BS) resources. In general, resources may include hardware resources such as an antenna, processor (or processing capacity), memory, network resources, and software and/or protocol entity resources that may include software programs, logic and/or protocol entities (or instances or implementations thereof) that may be running on one or more hardware resources, for example, either within core network domain 210 or within a BS or radio access network (RAN) domain 212, for example. NMO 214 may perform one or more network management operations such as lifecycle management, accounting, security, configuration, performance optimization, or fault detection and resolution for mobile network functions and elements.

Referring to FIG. 2, mobile network 200 may include a plurality of logical networks, where each logical network may include one or more mobile network resources allocated to the logical network. Also, each logical network may provide mobile (e.g., wireless) network services for one of a plurality of service categories and/or for a MNO. For at least some network resources, a mobile network resource may be sliced into a plurality of resource slices (or resource portions), where each resource slice may be allocated as a dedicated resource slice (e.g., dedicated to one logical network) or a shared resource slice (e.g., shared among a plurality of logical networks).

According to an example implementation, mobile network 200 may include a hierarchical arrangement of a plurality of resource slices, where a plurality of layers of resource slices are provided both horizontally (e.g., a same type of resource slice provided at a same layer for each of a plurality of logical networks) and vertically (e.g., a logical network including resource slices at each of a plurality of layers), where the resource slices may be dedicated to a single logical network or shared among multiple logical networks. Each logical network may provide mobile network services for a service category (e.g., MMTC, CMTC, MBB) that may include one or more services (e.g., VoIP, video, web browsing, IoT, self-driving vehicles, . . . ). Also, each logical network may provide mobile network services for one of a plurality of mobile network operators (MNOs). Or, for example, one or more logical networks may be provided or allocated (e.g., leased) to each of a plurality of service providers. For example, each automobile manufacturer, taxi-cab (or people delivery) service, package delivery service, etc., may obtain or be allocated its own logical network for a service category, such as for CMTC, in order to support self-driving vehicles for such automobile manufacturer, taxi-cab service or package delivery service. These are merely some illustrative examples and other examples may be used. In this manner, one physical mobile network 200 may be provided, where resources of the mobile network 200 (e.g., within the core network domain 210 and/or RAN domain 212) are sliced or divided into a plurality of resource slices (either shared or dedicated) that are allocated to each logical network.

A plurality of illustrative example logical networks are shown for mobile network 200 of FIG. 2. The example logical networks may each include, for example, a plurality of (or one or more) dedicated resource slices (or dedicated resources) and a plurality of (or one or more) shared resource slices/resources. The logical networks shown in FIG. 2 may include, for example: a logical network 220 to provide MBB service for MNO1 (mobile network operator 1); a logical network 230 to provide MBB service for MNO2 (mobile network operator 2); a logical network 240 to provide MMTC service for MNO3; a logical network 250 to provide MMTC service for MNO4 (mobile network operator 4); a logical network 260 to provide CMTC service for MNO5 (mobile network operator 5); and, a logical network 270 to provide CMTC service for MNO6 (mobile network operator 6). These are merely some example logical networks and example provided service categories, and others may be used.

The service provided by each logical network (e.g., by each of logical networks 220, 230, 240, 250, 260 or 270) may include one or more services. For example, logical network 220 may provide MBB service (mobile network service for MBB service category), including service 221A (e.g., VoLTE/VoIP) and service 221B (e.g., video delivery). The service categories for each of the other logical networks may similarly include one or more services that are provided over the logical network, for example.

According to an example implementation, data associated with each service category, and/or associated with each service may be detected by packet inspection. For example, each packet/frame header may be inspected, and a logical network, service category, MNO, and/or service for the packet may be identified based on one or more identifiers/fields that may be included in a packet or frame header, such as, for example, a flow label, an address(es), port number, protocol ID, or other field or information that may be provided in a packet header or frame header. As described in greater detail below, once a packet has been identified as being associated with a particular logical network, service category, MNO, and/or service, the packet may be scheduled for transmission, routed (between resource slices), transmitted, or otherwise processed in accordance with one or more parameters (e.g., service level agreement, priority, QoS level, . . . ) associated with such logical network, MNO, service category and/or service.

According to an example implementation, a multiplexer (MUX) may be provided at one or more different layers for each logical network, within the core network domain 210 and/or the RAN domain 212. In an example implementation, each MUX may, for example, perform packet or header inspection and then may perform data aggregation for downlink traffic (e.g., combining/aggregating data/traffic of multiple sources or that may be received from multiple higher layer resource slices to be forwarded to one or fewer lower layer resource slice(s). Similarly, in the uplink direction, each MUX may perform data/traffic splitting (demultiplexing), where the MUX may perform header inspection, and then may forward the data to one of several/multiple higher layer resource slices, for example. Thus, a MUX, in at least some cases, may provide an interface between one or more higher layer resource slices and one or more lower layer resource slices, particularly where the number of higher layer resource slices does not match the number of lower layer resource slices. Thus, in such cases, the MUX may perform data aggregation and/or data splitting.

In some cases, the (one or fewer number of) lower layer resource slices may be shared among multiple logical networks, service categories, services and/or MNOs, for example. Thus, each MUX may, at least in some cases, perform data aggregation and/or data splitting where the number of adjacent higher layer resources (the resource slices immediately higher than the MUX) does not match the adjacent number of lower layer resources (the number of immediately lower layer resources) that the MUX interfaces between. Each MUX may, for example, forward data between higher layer resource(s) and lower layer resource (s), which may include, e.g., the aggregation and/or splitting of data between higher and lower layer resources, depending on whether the data is for uplink (data sent from top of core network domain 210 to a PHY of RAN domain 212) or downlink transmission within the mobile network 200. For example, each MUX may perform data/traffic aggregation when, e.g., downlink data is being forwarded from multiple higher layer resource slices to fewer lower layer resource slices, for example. And, similarly, each MUX may perform data/traffic splitting when, e.g., uplink data is being forwarded from fewer lower layer resource slices to a greater number of higher layer resource slices.

Each MUX may, for example, operate under control of a Multiplexing Policy Function (MPF) (e.g., which may instrument the behavior or operation of a MUX or a protocol entity). Instrumenting the behavior or operation of a MUX or a protocol entity, by an MPF, may include controlling, varying or modulating the behavior of the MUX or protocol entity including setting the MUX rules or protocol entity rules according to the current context and the overall policy. For example, a MPF may be provided, such as MPF 282 (e.g., to provide MNO-specific control for a plurality of muxes and/or a plurality of MNO specific schedulers) and/or MPF 284 (e.g., to control various muxes or protocol entities across multiple MNOs). A MPF may control the forwarding of data, such as including the aggregation and/or splitting of data/traffic between higher and lower layer resource slices, scheduling and prioritization of data, and other processing that may be performed, e.g., based on one or more fields of the received data.

As noted, core network domain 210 may include one or more core network resources, such as a SGW and a PGW, etc. Thus, for example, within core network domain 210, each logical network may be allocated a slice of a PGW (e.g., a PGW slice), which may include a slice or portion of hardware resources at a PGW (e.g., a portion or slice of computational resources, memory, network resources) and a portion or slice of protocol entity/logic resources at the PGW. For example, the PGW slice may include a multiplexer (MUX) for inspecting and then forwarding received data, e.g., based on instructions received from MPF 282. Thus, for example, each logical network (e.g., within core network domain) may include a multiplexer (MUX) for performing packet inspection and then forwarding the packet to a selected (next lower layer) RAN resource slice of a selected logical network, based on which logical network or service category the received packet belongs, for example.

For example, as shown in FIG. 2, MPF 282 may allocate core network domain 210 resources to each logical network. For example, MUX 222 may be allocated to logical network 220 within core network domain 210. Similarly, MUXes 232, 242, 252 and 262 may be allocated to logical networks 230, 240, 250 and 260, respectively, for example. MUX 222 may receive packets for logical network 220 (including for MBB service for MNO1), including data/traffic for multiple services (e.g., service 221A and service 221B). MUX 222, e.g., under control of or based on instructions from multiplexing policy function (MPF) 282, may perform packet inspection on each received packet for logical network 220 (and/or MPF 282 may perform packet inspection) to determine the logical network, service category and/or service for each received packet based on a field(s) within the header of each received data/packet. MUX 222 may then forward each received packet to a lower layer resource slice of a selected (or corresponding) logical network. Thus, MUX 222 may detect a field within a header of each received packet indicating a logical network or service category, and may then forward the packet to a MNO specific scheduling resource slice of the associated logical network. Thus, for example, MUX 222 may detect a logical network ID or flow ID indicating logical network 220, and then may forward the received packet to MNO specific scheduler 223, for example. MUX 222 may aggregate data from multiple services into one MNO specific scheduler. Similarly, MUXes 232, 242, 252 and 262, e.g., under control of MPF 282, may forward received packets to a MNO specific scheduler associated with the logical network, service category or MNO for the data/packet.

According to an example implementation, based on instructions received from MPF 282, a MNO specific scheduler may perform MNO specific scheduling for various service flows (services 221A, 221B, etc.), e.g., based on one or more parameters associated with each service/service flow, such as priority, QoS requirements, . . . Thus, MNO specific scheduler 223, e.g., under control of MPF 282, may schedule/prioritize downlink traffic to be sent to a next lower layer resource slice, which is RRC (radio resource control entity 224A). The MNO specific scheduler 223 may perform scheduling or prioritizing of traffic/data based on specific instructions or priorities that are specific to the MNO1, for example. Similarly, other MNO specific schedulers may perform MNO specific scheduling of data/traffic down to a lower layer, e.g., based on rules or priorities for various services that may be handled for each MNO, such as for MNO2, MNO3, MNO4, MNO5, and/or MNO6. According to an example implementation, a different MNO specific scheduler may be provided for each MNO, and each MNO specific scheduler may operate under control of MPF 282, for example.

The next three lower layer resource slices, lower than MNO specific scheduler 223, are three protocol entities (e.g., protocol instances): RRC (radio resource control) entity 224A, PDCP (packet data convergence protocol) entity 224B, and RLC (radio link control) entity 224C. RRC entity 224A is responsible for handling a number of functions or procedures related to the Radio Access Network (RAN) including broadcast of system information necessary for the user device to be able to communicate with a cell or BS, transmission of paging messages originating from the core network to notify a user device about incoming connection requests, connection management including setting up bearers and mobility, mobility functions such as cell selection and reselection, and other control related functions. PDCP entity 224B may perform, for example, ciphering (encryption and decryption of data) and header compression-decompression. RLC entity 224C may perform segmentation/concatenation, error detection and correction, data retransmission, duplicate detection and in-sequence data delivery to higher layers.

According to an example implementation, MUX 222, MNO specific scheduler 223, RRC entity 224A, PDCP entity 224B and RLC entity 224C may be considered dedicated resource slices, e.g., because these resource slices are dedicated to the logical network 220 (e.g., and not shared among multiple logical networks). Similar resource slices may be dedicated to the other logical networks, as shown in FIG. 2. Similarly, RRC entity 234A, PDCP entity 234B and RLC entity 234C are dedicated to logical network 230.

At a layer immediately lower than RLC entities 224C and 234C, a multiplexer/MUX 225, under control of multiplexing policy function (MPF) 284, interfaces RLC entities 224C and 234C to a shared media access control (MAC1) entity 226. Thus, in this example, MUX 225 interfaces two higher layer resource slices (RLC entity 224C allocated/dedicated to logical network 220, and RLC entity 234C allocated/dedicated to logical network 230) to one lower layer resource slice (MAC1 226, shared between logical networks 220 and 230). Thus, for example, MUX 225 may perform data aggregation in the downlink direction, e.g., by receiving, prioritizing and/or scheduling for forwarding, traffic/data received from both RLC entity 224C of logical network 220 and RLC entity 234C of logical network 230. Scheduling or prioritizing the forwarding of downlink data to MAC1 226 may be based on instructions received from multiplexing agent 284, e.g., based on one or more parameters of the logical networks 220, 230, or the MNOs, service categories, etc. of the logical networks 220, 230.

In the uplink direction, MUX 225 may similarly perform header inspection (e.g., to determine a service category or logical network or MNO of each uplink data/packet, and then split or demultiplex the received uplink traffic/data between the RLC entities of the logical networks 220 and 230, depending on which logical network (or MNO or service category) that the data/traffic belongs. Therefore, MUX 225 may perform data/traffic splitting in the uplink direction by receiving uplink data from MAC1 226 and forwarding each data frame/packet to either RLC 224C or RLC 234C depending on whether the data is for logical network 220/MNO1, or for logical network 230/MNO2, for example, e.g., based on a header inspection performed by MUX 225 under control of MPF 284, for example. Thus, a flow label, address, port number or other field(s) in each data frame/packet may be used by MUX 225 to forward/route uplink data received by MUX 225 from MAC1 226 to either RLC 224C or RLC 234C.

Thus, MUX 225 may perform both data aggregation for downlink traffic, and data splitting for uplink traffic, for example. The other logical networks 240, 250 and 260 may operate in a similar manner as the entities within logical networks 220, 230. Thus, MUX 235 (and other muxes shown) may operate in a similar fashion to MUX 225. Thus, for example, MUX 235 may perform data/traffic aggregation in the downlink direction and/or perform data/traffic splitting in the uplink direction, e.g., based on instructions from MPF 284.

Alternatively, MAC1 226 may perform the scheduling or prioritizing for the downlink transmission or forwarding of data/traffic, e.g., based on instructions received from MPF 284. In such case, downlink data from logical networks 220 and 230 may be aggregated (combined) by MUX 225, and then MAC 1 225 may schedule/prioritize the downlink transmission/forwarding of the data/packets (as between different logical networks 220, 230) to a MUX 227, e.g., based on QoS, priority or other parameters associated with logical networks 220, 230, or the service category or MNO of each logical network, which may be known by MPF 284 and used by MPF 284 to control or provide instructions to control operation of MUX 225, MAC1 226 and MUX 227 for example.

Thus, in this manner, a multi-level data scheduler is provided among the hierarchical resource slices. A (upper layer) service-level data scheduling may be performed by MUX 222 and MUX 232 (as well as MUXes 242, 253, 262, as other examples) based on the service (out of multiple services) of the received traffic, whereas a (lower layer, or middle layer) logical network-level data scheduling may be performed for data/traffic by MUX 225 and/or MAC1 226 (for logical networks 220, 230), for example, as well as by MUX 235 and/or MAC2 236 (e.g., for logical networks logical networks 240, 250). Further hierarchical levels of data scheduling may be provided as well, such as by MUX 227, which may also be based on service category. Thus, for example, as shown in FIG. 2, MUX 227 (for logical networks 220, 230, 240 and 250) may receive downlink traffic/data from MAC1 226 and MAC2 236, where MAC1 226 includes aggregated traffic associated with logical networks 220 and 230 (MBB service category), where MAC2 236 includes aggregated downlink traffic associated with logical networks 230, 240 (MMTC traffic). Thus, MUX 227, e.g., based on instructions from MPF 284, e.g., based on QoS, priority, service level agreements, or other parameters for the various logical networks, MNOs or service categories and/or services (for example), prioritizes and/or schedules the transmission of downlink data/traffic for transmission over PHY1. According to an example implementation, MUX 227 may use header inspection to determine the logical network, MNO, service category or service for each received downlink packet or frame, and then the MUX 227 may schedule or prioritize the transmission of each packet/frame via PHY 1 228 based on the QoS, priority, service level agreements, etc., as between these various logical networks, MNOs, service categories and/or services. In the uplink direction, MUX 227 may receive uplink data from PHY1 228, and may perform header inspection to determine the logical network, MNO, service category or service, etc., for each received data frame or packet, and then forward each frame/packet to either MAC1 226 (e.g., for data associated with logical networks 220, 230, and/or MNO1, MNO2) or to MAC2 236 (e.g., for data associated with logical networks 240, 250 and/or MNO3, MNO4). Within uplink traffic to be sent to each of MAC1 226 and MAC2 236, MUX 227 may prioritize or schedule data/traffic for logical networks 220, 230/MNO1, MNO2 (for traffic being sent to MAC1 226), and may schedule or prioritize data/traffic for logical networks 240, 250/MNO3, MNO4 (for traffic being sent to MAC2 236), e.g., based on QoS, priority, service level agreement or other criteria for each logical network, MNO, service category and/or service. MUXes 225 and 235, MAC1 226 and MAC2 236, MUX 227 and PHY1 228 (as well as similar functions or blocks for other logical networks, e.g., MAC3, PHY2) may operate under control of MPF 284, for example.

Thus, it can be seen that the following resource slices are shared resource slices: MUX 225, MAC1 226 (shared among logical networks 220, 230); MUX 235 and MAC2 236 (shared among logical networks 240, 250); MUX 227 and PHY1 228 (shared among the MBB service category of logical networks 220 and 230, and MMTC service category of logical networks 240, 250). Thus, while a PHY1 228 is shared in this example between two service categories (e.g., MBB, MMTC), a separate PHY resource slice may be provided for each service category, such as PHY2 that is provided for CMTC (logical networks 260, 270 of CMTC service category). Thus, in an example implementation, a separate PHY may be provided for each of the following service categories: MBB, MMTC, CMTC, for example. Also, spectrum 229 may be considered a shared resource, since traffic from PHY1 and from PHY2 may be sent over the spectrum 229, for example. Spectrum 229 may be owned and provided by one MNO, or maybe owned and provided by multiple MNOs.

According to an example implementation, an apparatus may include a hierarchical arrangement of a plurality of resource slices of a mobile network, wherein each of a plurality of logical networks is allocated a resource slice within the mobile network for each of a plurality of layers, wherein each logical network provides network services for one of a plurality of service categories; wherein each logical network is allocated at least one dedicated resource slice that is dedicated to the logical network, and at least one shared resource slice that is shared among a plurality of the logical networks; the plurality of resource slices including a plurality of resource slices of a first layer and a plurality of resource slices of a second layer, wherein the first layer is lower than the second layer, wherein data from a set of the resource slices of the second layer are aggregated into a first (e.g., a single) resource slice of the first layer; a multiplexer interfacing at least between the set of resource slices of the second layer and the first resource slice of the first layer; and a multiplexing policy function (MPF) configured to control the multiplexer to aggregate data of the set of resource slices of the second layer into the first slice of the first layer.

According to an example implementation of the apparatus, the multiplexer is configured to perform one or more of the following: forward data from the first resource slice of the first layer to a selected resource slice of the set of resource slices of the second layer; forward data from one or more resource slices of the second layer to the resource slice of the first layer; encapsulate data within a different protocol format before forwarding the data to a different layer; decapsulate data carried within a protocol format before forwarding the data to a different layer; and convert the data from one format to another format before forwarding the data to a different layer.

According to an example implementation of the apparatus, the apparatus may further include a multi-level scheduler configured to schedule data for transmission, including: a logical network-specific pre-scheduler, provided for each of one or more logical networks, configured to schedule a transmission of data for one of the logical networks; and a shared scheduler configured to receive and schedule aggregated data for a plurality of logical networks.

According to an example implementation of the apparatus, the multi-level scheduler schedules data for transmission based on signals from the multiplexing policy function (MPF).

According to an example implementation of the apparatus, the shared scheduler may include: a media access control (MAC) entity that receives aggregated data from an upper layer protocol entity of each of a plurality of logical networks, and schedules the transmission of the aggregated data of the plurality of logical networks based on signals from the multiplexing policy function (MPF).

According to an example implementation of the apparatus, the apparatus further including a service category-specific physical layer (PHY) entity provided for each of one or more service categories, wherein data is input to the PHY entity from one or more logical networks of a service category.

According to an example implementation of the apparatus, the apparatus further include a service category-specific physical layer (PHY) entity provided for each of one or more service categories, wherein data is input to the PHY entity from one or more logical networks of a service category, wherein the service category-specific PHY entity for each of one or more service categories comprises at least one of the following: PHY entity may include a PHY entity for critical machine type communication; a PHY entity for massive machine type communication, including Internet of Things (IoT) communication; and/or a PHY entity for mobile broadband connectivity.

According to an example implementation of the apparatus, the apparatus may further include a shared physical layer (PHY) entity provided for a plurality of service categories, wherein data is input to the shared PHY entity from a logical network for each of a plurality of service categories.

According to an example implementation of the apparatus, the apparatus may further include a service category-specific physical layer (PHY) slice provided for each of one or more service categories, including one or more of the following: a PHY slice for critical machine type communication; a PHY slice for massive machine type communication, including Internet of Things (IoT) communication; and a PHY slice for mobile broadband connectivity.

Figure 3:
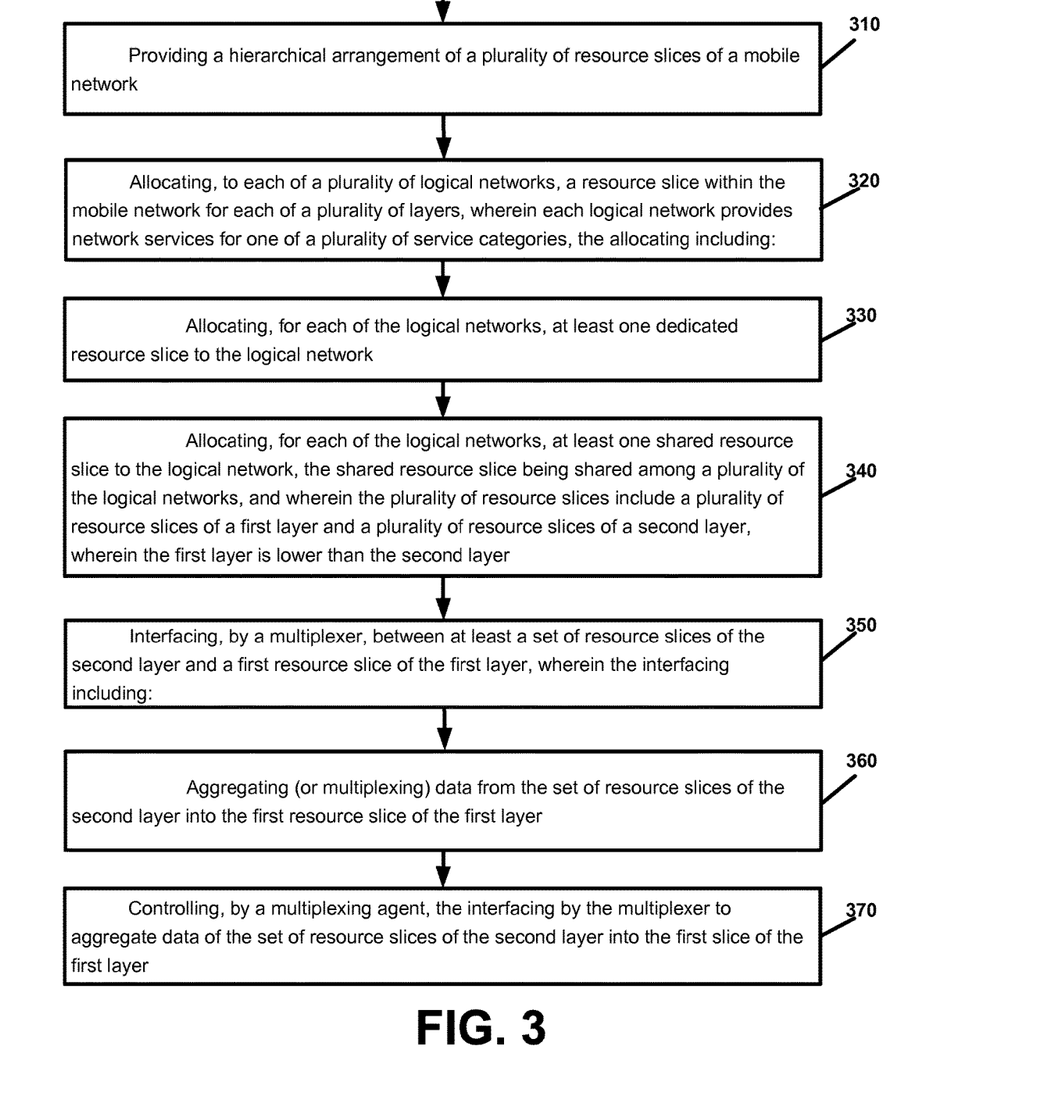
FIG. 3 is a flow chart illustrating operation of a mobile network according to an example implementation.

FIG. 3 is a flow chart illustrating operation of a mobile network according to an example implementation. Operation 310 includes providing a hierarchical arrangement of a plurality of resource slices of a mobile network. Operation 320 includes allocating, to each of a plurality of logical networks, a resource slice within the mobile network for each of a plurality of layers, wherein each logical network provides network services for one of a plurality of service categories, the allocating including: allocating (operation 330), for each of the logical networks, at least one dedicated resource slice to the logical network; and allocating (operation 340), for each of the logical networks, at least one shared resource slice to the logical network, the shared resource slice being shared among a plurality of the logical networks, and wherein the plurality of resource slices include a plurality of resource slices of a first layer and a plurality of resource slices of a second layer, wherein the first layer is lower than the second layer. Operation 350 includes interfacing, by a multiplexer, between at least a set of resource slices of the second layer and a first resource slice of the first layer, wherein the interfacing includes:

aggregating (or multiplexing) (operation 360) data from the set of resource slices of the second layer into the first resource slice of the first layer. Operation 370 includes controlling, by a multiplexing policy function (MPF), the interfacing by the multiplexer to aggregate data of the set of resource slices of the second layer into the first slice of the first layer.

According to an example implementation of the method of FIG. 3, the interfacing includes one or more of the following: forwarding data from the first resource slice of the first layer to a selected resource slice of the set of resource slices of the second layer; forwarding data from one or more resource slices of the set of resource slices of the second layer to the first resource slice of the first layer; encapsulating data within a different protocol format before forwarding the data to a different layer; decapsulating data carried within a protocol format before forwarding the data to a different layer; and converting the data from one format to another format before forwarding the data to a different layer.

According to an example implementation of the method of FIG. 3, the method may further include scheduling data for transmission based on signals from the multiplexing policy function (MPF), including: performing a logical network-specific pre-scheduling for each of one or more logical networks; and performing scheduling of aggregated pre-scheduled data for a plurality of logical networks.

According to an example implementation of the method of FIG. 3, the performing scheduling of aggregated pre-scheduled data may include: receiving aggregated scheduled data from an upper layer resource slice of each of a plurality of logical networks; and scheduling a transmission of the aggregated pre-scheduled data of the plurality of logical networks based on signals from the multiplexing policy function (MPF).

According to an example implementation, a computer program product, includes a computer-readable storage medium and storing executable code that, when executed by at least one data processing apparatus, is configured to cause the at least one data processing apparatus to perform a method of any method operations described herein.

An apparatus comprising at least one processor and at least one memory including computer instructions, when executed by the at least one processor, cause the apparatus to perform the method of any method operations described herein.

According to another example implementation, an apparatus includes means (e.g., 402A/402B, and/or 404, FIG. 4) for providing a hierarchical arrangement of a plurality of resource slices of a mobile network; means (e.g., 402A/402B, and/or 404, FIG. 4) for allocating, to each of a plurality of logical networks, a resource slice within the mobile network for each of a plurality of layers, wherein each logical network provides network services for one of a plurality of service categories, the means for allocating including: means (e.g., 402A/402B, and/or 404, FIG. 4) for allocating, for each of the logical networks, at least one dedicated resource slice to the logical network; and means (e.g., 402A/402B, and/or 404, FIG. 4) for allocating, for each of the logical networks, at least one shared resource slice to the logical network, the shared resource slice being shared among a plurality of the logical networks, and wherein the plurality of resource slices include a plurality of resource slices of a first layer and a plurality of resource slices of a second layer, wherein the first layer is lower than the second layer; means (e.g., 402A/402B, and/or 404, FIG. 4) for interfacing, by a multiplexer, between at least a set of resource slices of the second layer and a first resource slice of the first layer, wherein the means for interfacing includes: means (e.g., 402A/402B, and/or 404, FIG. 4) for aggregating (or multiplexing) data from the set of resource slices of the second layer into the first resource slice of the first layer; and means (e.g., 402A/402B, and/or 404, FIG. 4) for controlling, by a multiplexing policy function (MPF), the interfacing by the multiplexer to aggregate data of the set of resource slices of the second layer into the first slice of the first layer.

Therefore, in an example implementation, a mobile network may include radio access points, transport network, and data centers that perform part of mobile network functionality, organized in a way that a network management and orchestration functionality, including at least one multiplexing policy function (MPF),realizes a hierarchical ("funnel-like") slice topology across vertical layers; this hierarchical slice topology allows for slices on lower layers processing traffic for one or more slices on higher layers, i.e. multiple higher layer slices are multiplexed into a reduced number of lower layer slices; a shared utilization of common resources (such as the radio scheduler) is realized in an efficient, coordinated manner. Each slice layer may be controlled individually by a management and orchestration entity.

Further illustrative example details may include, for example:

Multiple slice instances comprising the same or different mobile network functionality (customized to use case); Multi-level scheduling where pre-scheduling is performed at higher slices, and individual, independent (radio)scheduling is performed at lower layer slices; Each lower layer slice may contain dedicated spectrum; Lower layer slices may share spectrum according to defined prioritization policies; Each lower layer slice may be implemented on dedicated signal processing hardware; The multiplexing of higher layer slices into lower layer slices may be configurable according to QoS/QoE criteria; Alternatively to a dedicated control entity for slice multiplexing, in-band signaling may forward the required control information According to an example implementation, a slice concept is implemented, where slices (e.g., resource slices) running lower layer protocol functionality (lower slices) provide interfaces to slices performing higher layer protocol functionality (higher slices). This can be done in an arbitrary number of horizontal cuts, i.e., the mobile network protocol functionality can be divided into N different layers where each layer is implemented in an own slice. Based on the nature of the provided communication service, slices then use different implementations or configurations. For instance, assume that two operators A and B provide mobile broadband services, and each operator wants to use its own implementation of core network functionality as well as RRC, PDCP, and RLC in the RAN. Then, each operator may implement this in an own slice. However, possibly both operators may use the same MAC implementation which would then be shared on a lower slice. Finally, the PHY implementation could be shared with services such as IoT services on yet another lower slice implementing the PHY of a mobile network.

According to an example implementation, a vertical Management and Orchestration layer may be used. This layer may be responsible for all protocol functionality and network slicing in general, and for service/packet scheduling policy in particular. For example, lower layers may contain dedicated schedulers per communication service user even though the lower layer may be shared by multiple communication service users (higher slices). The scheduling process can be divided then in the following steps: Pre-scheduling within each higher slice would operate on a service-level in order to schedule packets according QoS/QoE rules defined by the users of higher slice; A commonly used scheduler within the shared lower slice which performs a pre-scheduling of possibly virtualized resources; Dedicated schedulers per higher slice which implements rules for the actual assignment of MAC layer packets to possibly virtualized resources. An example advantage of this implementation is the ability to allow each operator of a communication service to implement or configure its own scheduling policy, e.g. proportional fairness with different configuration parameters. The assignment may be done through an interface which provides virtualized resources that map to physical resources. The assigned resources may depend on the demand indicated at higher slices and based on service level agreements; the share of overall resources may be configured and time-variant based on the actual demand. Each lowest slice may involve dedicated spectrum, i.e., dedicated physical resources. These resources may be addressed through a virtualization interface (see above). However, the number of resources may be guaranteed and part of the lowest slice.

In an example implementation, it may be that the underlying computation platform only executes a predefined number of slices which receive a pre-defined or upper-bounded number of storage and computational resources. Each of these slices may still interface to a flexible number of higher slices. This may be relevant in the case of non-virtualized (physical) network functions that are characterized by highly coupled (embedded) software and hardware systems, such as base stations. The multiplexing of higher slices into lower slices may be performed according to per-cell or multiple-cell rules based on different criteria such as average/minimum throughput, average/minimum number of assigned physical resources, or average/minimum occupied storage/computational resources.

In an example implementation, one or more example advantages or features may include: Service-tailored composition of a (logical) mobile network; Operation of multiple logical networks (e.g., multiple M(V)NOs) using the same infrastructure, thus leveraging the economies of scale of utilizing a common underlying infrastructure; Coordinated utilization of shared resources among several logical mobile network instances, including improved efficiency by overcoming static resource allocations; Fast deployment and reconfiguration of logical networks through software; Integration of bare metal resources; Implementation of network-specific schedulers while leveraging multiplexing gains also on lower layers.

Figure 4:
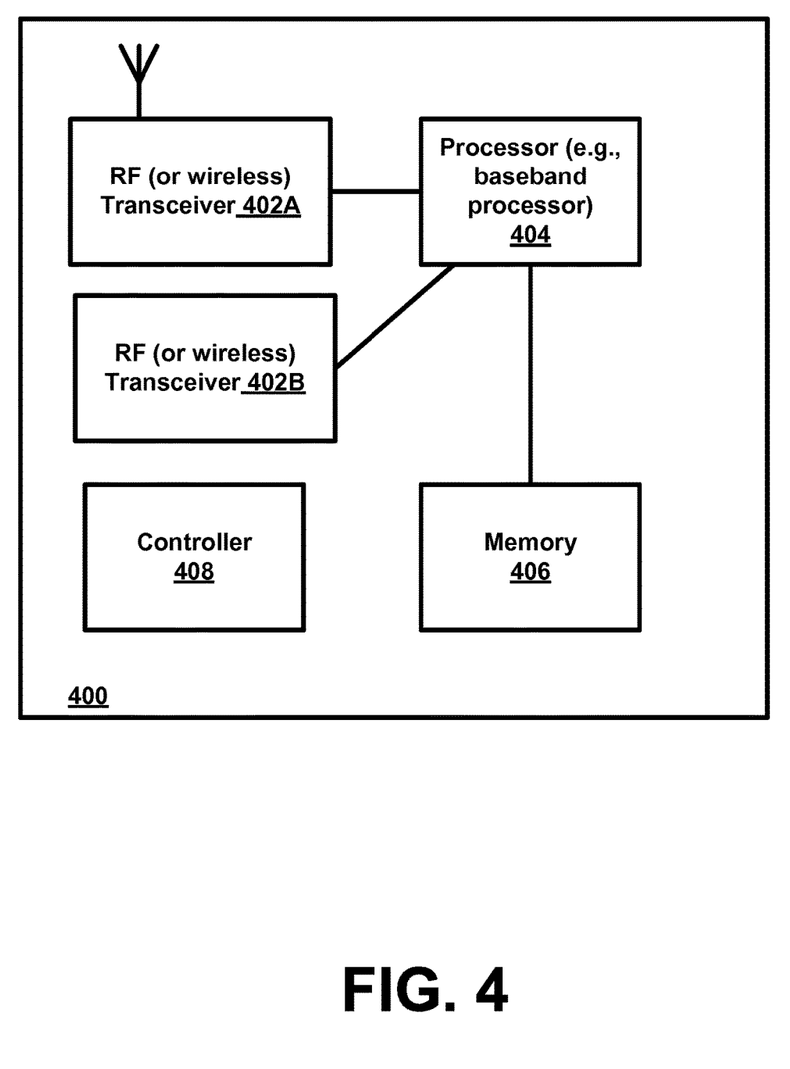
FIG. 4 is a block diagram of a node or wireless station (e.g., base station/access point or mobile station/user device/UE) according to an example implementation.

FIG. 4 is a block diagram of a wireless station (e.g., AP or user device) 400 according to an example implementation. The wireless station 400 may include, for example, one or two RF (radio frequency) or wireless transceivers 402A, 402B, where each wireless transceiver includes a transmitter to transmit signals and a receiver to receive signals. The wireless station also includes a processor or control unit/entity (controller) 404 to execute instructions or software and control transmission and receptions of signals, and a memory 406 to store data and/or instructions.

Processor 404 may also make decisions or determinations, generate frames, packets or messages for transmission, decode received frames or messages for further processing, and other tasks or functions described herein. Processor 404, which may be a baseband processor, for example, may generate messages, packets, frames or other signals for transmission via wireless transceiver 402 (402A or 402B). Processor 404 may control transmission of signals or messages over a wireless network, and may control the reception of signals or messages, etc., via a wireless network (e.g., after being down-converted by wireless transceiver 402, for example). Processor 404 may be programmable and capable of executing software or other instructions stored in memory or on other computer media to perform the various tasks and functions described above, such as one or more of the tasks or methods described above. Processor 404 may be (or may include), for example, hardware, programmable logic, a programmable processor that executes software or firmware, and/or any combination of these. Using other terminology, processor 404 and transceiver 402 together may be considered as a wireless transmitter/receiver system, for example.

In addition, referring to FIG. 4, a controller (or processor) 408 may execute software and instructions, and may provide overall control for the station 400, and may provide control for other systems not shown in FIG. 4, such as controlling input/output devices (e.g., display, keypad), and/or may execute software for one or more applications that may be provided on wireless station 400, such as, for example, an email program, audio/video applications, a word processor, a Voice over IP application, or other application or software.

In addition, a storage medium may be provided that includes stored instructions, which when executed by a controller or processor may result in the processor 404, or other controller or processor, performing one or more of the functions or tasks described above.

According to another example implementation, RF or wireless transceiver(s) 402A/402B may receive signals or data and/or transmit or send signals or data. Processor 404 (and possibly transceivers 402A/402B) may control the RF or wireless transceiver 402A or 402B to receive, send, broadcast or transmit signals or data.

The embodiments are not, however, restricted to the system that is given as an example, but a person skilled in the art may apply the solution to other communication systems. Another example of a suitable communications system is the 5G concept. It is assumed that network architecture in 5G will be quite similar to that of the LTE-advanced. 5G is likely to use multiple input-multiple output (MIMO) antennas, many more base stations or nodes than the LTE (a so-called small cell concept), including macro sites operating in co-operation with smaller stations and perhaps also employing a variety of radio technologies for better coverage and enhanced data rates.

It should be appreciated that future networks will most probably utilise network functions virtualization (NFV) which is a network architecture concept that proposes virtualizing network node functions into "building blocks" or entities that may be operationally connected or linked together to provide services. A virtualized network function (VNF) may comprise one or more virtual machines running computer program codes using standard or general type servers instead of customized hardware. Cloud computing or data storage may also be utilized. In radio communications this may mean node operations may be carried out, at least partly, in a server, host or node operationally coupled to a remote radio head. It is also possible that node operations will be distributed among a plurality of servers, nodes or hosts. It should also be understood that the distribution of labour between core network operations and base station operations may differ from that of the LTE or even be non-existent.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device or in a propagated signal, for execution by, or to control the operation of, a data processing apparatus, e.g., a programmable processor, a computer, or multiple computers. Implementations may also be provided on a computer readable medium or computer readable storage medium, which may be a non-transitory medium. Implementations of the various techniques may also include implementations provided via transitory signals or media, and/or programs and/or software implementations that are downloadable via the Internet or other network(s), either wired networks and/or wireless networks. In addition, implementations may be provided via machine type communications (MTC), and also via an Internet of Things (IOT).

The computer program may be in source code form, object code form, or in some intermediate form, and it may be stored in some sort of carrier, distribution medium, or computer readable medium, which may be any entity or device capable of carrying the program. Such carriers include a record medium, computer memory, read-only memory, photoelectrical and/or electrical carrier signal, telecommunications signal, and software distribution package, for example. Depending on the processing power needed, the computer program may be executed in a single electronic digital computer or it may be distributed amongst a number of computers.

Furthermore, implementations of the various techniques described herein may use a cyber-physical system (CPS) (a system of collaborating computational elements controlling physical entities). CPS may enable the implementation and exploitation of massive amounts of interconnected ICT devices (sensors, actuators, processors microcontrollers, . . . ) embedded in physical objects at different locations. Mobile cyber physical systems, in which the physical system in question has inherent mobility, are a subcategory of cyber-physical systems. Examples of mobile physical systems include mobile robotics and electronics transported by humans or animals. The rise in popularity of smartphones has increased interest in the area of mobile cyber-physical systems. Therefore, various implementations of techniques described herein may be provided via one or more of these technologies.

A computer program, such as the computer program(s) described above, can be written in any form of programming language, including compiled or interpreted languages, and can be deployed in any form, including as a stand-alone program or as a module, component, subroutine, or other unit or part of it suitable for use in a computing environment. A computer program can be deployed to be executed on one computer or on multiple computers at one site or distributed across multiple sites and interconnected by a communication network.

Method steps may be performed by one or more programmable processors executing a computer program or computer program portions to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer, chip or chipset. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in, special purpose logic circuitry.

To provide for interaction with a user, implementations may be implemented on a computer having a display device, e.g., a cathode ray tube (CRT) or liquid crystal display (LCD) monitor, for displaying information to the user and a user interface, such as a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the true spirit of the various embodiments.

What is claimed is:

1. An apparatus comprising:
a hierarchical arrangement of a plurality of resource slices of a mobile network, wherein each of a plurality of logical networks is allocated a resource slice within the mobile network for each of a plurality of layers, wherein each logical network provides network services for one of a plurality of service categories;
wherein each logical network is allocated at least one dedicated resource slice that is dedicated to the logical network, and at least one shared resource slice that is shared among a plurality of the logical networks;
the plurality of resource slices including a plurality of resource slices of a first layer and a plurality of resource slices of a second layer, wherein the first layer is lower than the second layer, wherein data from a set of the resource slices of the second layer are aggregated into a first resource slice of the first layer;

a multiplexer interfacing at least between the set of resource slices of the second layer and the first resource slice of the first layer; and a multiplexing policy function configured to control the multiplexer to aggregate data of the set of resource slices of the second layer into the first slice of the first layer.

2. The apparatus of claim 1 wherein the multiplexer is configured to perform one or more of the following:

forward data from the first resource slice of the first layer to a selected resource slice of the set of resource slices of the second layer;

forward data from one or more resource slices of the second layer to the resource slice of the first layer;

encapsulate data within a different protocol format before forwarding the data to a different layer;

decapsulate data carried within a protocol format before forwarding the data to a different layer; and convert data from one format to another before forwarding the data to a different layer.

3. The apparatus of claim 1 and further comprising:

a multi-level scheduler configured to schedule data for transmission, including:

a logical network-specific or a mobile network operator (MNO)-specific pre-scheduler, provided for each of one or more logical networks or mobile network operators, configured to schedule a transmission of data for one of the logical networks or one of the mobile network operators; and a shared scheduler provided for multiple mobile network operators configured to receive and schedule aggregated data for a plurality of logical networks or a plurality of mobile network operators.

4. The apparatus of claim 3 wherein the multi-level scheduler schedules data for transmission based on signals from the multiplexing policy function.

5. The apparatus of claim 3 wherein the shared scheduler comprises:

a media access control (MAC) entity that receives aggregated data from an upper layer protocol entity of each of a plurality of logical networks, and schedules the transmission of the aggregated data of the plurality of logical networks based on signals from the multiplexing policy function.

6. The apparatus of claim 1 and further comprising:

a service category-specific physical layer (PHY) entity provided for each of one or more service categories, wherein data is input to the PHY entity from one or more logical networks of a service category.

7. The apparatus of claim 1 and further comprising:

a service category-specific physical layer (PHY) entity provided for each of one or more service categories, wherein data is input to the PHY entity from one or more logical networks of a service category, wherein the service category-specific PHY entity for each of one or more service categories comprises at least one of the following:

a PHY entity for critical machine type communication;

a PHY entity for massive machine type communication, including Internet of Things (IoT) communication; and a PHY entity for mobile broadband connectivity.

8. The apparatus claim 1 and further comprising:

a shared physical layer (PHY) entity provided for a plurality of service categories, wherein data is input to the shared PHY entity from a logical network for each of a plurality of service categories.

9. The apparatus of claim 1 and further comprising:

a service category-specific physical layer (PHY) slice provided for each of one or more service categories, including one or more of the following:

a PHY slice for critical machine type communication;

a PHY slice for massive machine type communication, including Internet of Things (IoT) communication; and a PHY slice for mobile broadband connectivity.

10. A method comprising:

providing a hierarchical arrangement of a plurality of resource slices of a mobile network;

allocating, to each of a plurality of logical networks, a resource slice within the mobile network for each of a plurality of layers, wherein each logical network provides network services for one of a plurality of service categories, the allocating including:

allocating, for each of the logical networks, at least one dedicated resource slice to the logical network; and allocating, for each of the logical networks, at least one shared resource slice to the logical network, the shared resource slice being shared among a plurality of the logical networks, and wherein the plurality of resource slices include a plurality of resource slices of a first layer and a plurality of resource slices of a second layer, wherein the first layer is lower than the second layer;

interfacing, by a multiplexer, between at least a set of resource slices of the second layer and a first resource slice of the first layer, wherein the interfacing includes:

aggregating or multiplexing data from the set of resource slices of the second layer into the first resource slice of the first layer; and controlling, by a multiplexing policy function, the interfacing by the multiplexer to aggregate data of the set of resource slices of the second layer into the first slice of the first layer.

11. The method of claim 10 wherein the interfacing comprises one or more of the following:

forwarding data from the first resource slice of the first layer to a selected resource slice of the set of resource slices of the second layer;

forwarding data from one or more resource slices of the set of resource slices of the second layer to the first resource slice of the first layer; and encapsulating data within a different protocol format before forwarding the data to a different layer;

decapsulating data carried within a protocol format before forwarding the data to a different layer; and converting data from one format to another before forwarding the data to a different layer.

12. The method of claim 10 and further comprising:

scheduling data for transmission based on signals from the multiplexing policy function, including:

performing a logical network-specific pre-scheduling for each of one or more logical networks; and performing scheduling of aggregated pre-scheduled data for a plurality of logical networks.

13. The method of claim 12 wherein the performing scheduling of aggregated pre-scheduled data comprises:

receiving aggregated scheduled data from an upper layer resource slice of each of a plurality of logical networks; and scheduling a transmission of the aggregated pre-scheduled data of the plurality of logical networks based on signals from the multiplexing policy function.

14. A computer program product, the computer program product comprising a non-transitory computer-readable storage medium and storing executable code that, when executed by at least one data processing apparatus, is configured to cause the at least one data processing apparatus to perform a method of claim 10.

15. An apparatus comprising at least one processor and at least one memory including computer instructions, when executed by the at least one processor, cause the apparatus to perform the method of claim 10.

* * * * *